United States Defensive Publication [19] (H) [11] T102,904

Wenghoefer [43] Apr. 5, 1983

[54] TIRE CORD ADHESION

[76] Inventor: Hans M. Wenghoefer, 1513 Maple St., Wilmington, Del. 19805

[21] Appl. No.: 343,073

[22] Filed: Jan. 27, 1982

[51] Int. Cl.[3] ..... B29H 17/00; B05D 3/00

[52] U.S. Cl. ..... 156/110 A; 427/226; 156/331.2

[57] ABSTRACT

It has been found that the adhesion of aramid tire cord to rubber tire stock can be improved by pretreating the tire cord with a polyazidoformate under conditions calculated to only partially decompose the azidoformate groups.

1 Claim, No Sheets Drawing,

10 Pages Specification

The file of this unexamined application may be inspected and copies thereof may be purchased (849 O.G. 1221, Apr. 9, 1968).